US008258222B2

(12) United States Patent
Otaka et al.

(10) Patent No.: US 8,258,222 B2
(45) Date of Patent: Sep. 4, 2012

(54) COMPOSITION FOR VULCANIZED RUBBER AND VULCANIZATION PRODUCT

(75) Inventors: Toyofumi Otaka, Osaka (JP); Shigeru Shoji, Osaka (JP); Yasushi Hamura, Osaka (JP); Toshiyuki Funayama, Osaka (JP)

(73) Assignee: Daiso Co., Ltd., Osaka-Shi (JP)

( * ) Notice: Subject to any disclaimer, the term of this patent is extended or adjusted under 35 U.S.C. 154(b) by 0 days.

(21) Appl. No.: 11/285,386

(22) Filed: Nov. 23, 2005

(65) Prior Publication Data

US 2006/0128857 A1 Jun. 15, 2006

(30) Foreign Application Priority Data

Nov. 24, 2004 (JP) ................................. 2004-339330

(51) Int. Cl.
 *C04B 35/634* (2006.01)
 *C08K 5/09* (2006.01)
 *C08K 5/04* (2006.01)
 *C08K 5/05* (2006.01)
 *D06M 15/693* (2006.01)
 *C08F 220/04* (2006.01)
 *B03D 1/016* (2006.01)
 *C08L 27/00* (2006.01)

(52) U.S. Cl. ......... 524/322; 524/379; 524/394; 524/551

(58) Field of Classification Search .................. 524/322, 524/379, 394, 551
See application file for complete search history.

(56) References Cited

U.S. PATENT DOCUMENTS

| 3,876,590 A | 4/1975 | Shimogawa et al. ........... 260/79 |
| 4,357,446 A | 11/1982 | Matoba .......................... 525/281 |
| 7,029,736 B2 * | 4/2006 | Ainsworth ................. 428/36.91 |

FOREIGN PATENT DOCUMENTS

| JP | 51-37220 | | 10/1976 |
| JP | 58-142937 | | 8/1983 |
| JP | 59-227946 | | 12/1984 |
| JP | 2001107013 A | * | 4/2001 |
| JP | 2004059783 A | * | 2/2004 |
| JP | 2004-323564 A | * | 11/2004 |

OTHER PUBLICATIONS

Akrochem Corporation, Mineral Fillers, Hysafe, Feb. 6, 2004.*
English Translation of Yamada et al. (JP 59-227946).*
U.K. Search Report dated Mar. 22, 2006.

* cited by examiner

*Primary Examiner* — Mark Eashoo
*Assistant Examiner* — Angela C Scott
(74) *Attorney, Agent, or Firm* — Kratz, Quintos & Hanson, LLP

(57) ABSTRACT

A composition for epihalohydrin vulcanized rubber excellent in heat resistance while keeping good vulcanization rate and store stability, comprising (a) an epihalohydrin robber, (b) a metal soap, (c) an acid acceptor, and (d) a vulcanizing agent, the composition further preferably containing (e) a fatty acid for suppressing vulcanization, or preferably containing (f) an alcohol for accelerating vulcanization.

6 Claims, No Drawings

COMPOSITION FOR VULCANIZED RUBBER AND VULCANIZATION PRODUCT

BACKGROUND OF THE INVENTION

1. Field of the Invention

The present invention relates to a composition for obtaining a vulcanized rubber comprising an epihalohydrin rubber as a main component improved with heat resistance and a vulcanized product obtained by vulcanizing the composition.

2. Description of the Prior Art

Epihalohydrin rubber materials have been widely used in the application use of automobiles as materials for fuel hoses, air hoses and tubes while taking advantages such as heat resistance, oil resistance and ozone resistance thereof. Further, while epihalohydrin rubbers have been obtained so far by vulcanization using thiourea type vulcanizing agents and lead-based acid acceptors, the vulcanizing agent-acid acceptor systems have some concern in view of the toxicity of lead and toxicity of the vulcanizing agent and, further, the vulcanization rate is not sufficient as well.

Further, as the vulcanizing agent for the epihalohydrin rubber, a mercaptotriazine vulcanizing agent (JP-B No. 48-36926), a quinoxaline vulcanizing agent (JP-A No. 56-122866), etc. have been known and since the vulcanizing rate can be improved to obtain products of good heat resistance by using the vulcanizing agents, they have been popularized generally.

On the other hand, as the acid acceptors to be combined with the vulcanizing agents, magnesium oxide, lead compound, zinc oxide, synthetic hydrotalcite, slaked lime, quick lime, etc. have been properly selected in accordance with required characteristics for the rubber materials such as store stability, mechanical property, compression set property, ozone resistance, cold resistance, and oil resistance, processing method of rubber materials, economicity of vulcanizing agents, etc. Further, as a vulcanization accelerator, general vulcanization accelerators for rubbers, quaternary amine compounds, quaternary phosphonium salts, etc. have been used. (JP-A No. 59-227946)

However, emission regulation and regulations for fuel evaporation for automobiles have become increasingly severer in recent years and, further, along with low fuel cost, improvement in the performance of engines, and need for maintenance-free parts, a further improvement in the heat resistance has been demanded for rubber materials for use in automobiles.

SUMMARY OF THE INVENTION

Under the situations described above, the present invention intends to provide an epihalohindrin vulcanized rubber excellent in the heat resistance while maintaining a favorable vulcanization rate and store stability.

As a result of various studies made by the present inventors for overcoming the problems described above, it has been found that a composition for an epihalohydrin vulcanized rubber excellent in the heat resistance while keeping favorable vulcanization rate and store stability can be obtained by adding a metal soap to the composition for the epihalohydrin vulcanized rubber to make it act as a vulcanization accelerator, thereby the present invention was accomplished.

That is, the present invention provides a composition for a vulcanized rubber comprising: (a) an epihalohydrin rubber, (b) a metal soap, (c) an acid acceptor, and (d) a vulcanizing agent.

The composition according to the invention can further contain (e) a fatty acid and/or (f) alcohols.

A preferred metal soap is a sodium salt and/or potassium salt, the former being more preferred. The metal soap is preferably a fatty acid sodium salt and/or potassium salt having 12 to 24 carbon atoms, sodium stearate and/or potassium stearate being particularly preferred.

A preferred acid acceptor is a metal compound and/or inorganic micro-porous crystal. A preferred inorganic micro-porous crystal is selected from the group consisting of synthetic hydrotalcite, Li—Al inclusion compounds and synthetic zeolite. Among all, synthetic hydrotalcite is preferred.

As the vulcanizing agent, a quinoxaline vulcanizing agent or triazine vulcanizing agent is preferred, the former being more preferred. 6-methylquinoxalin-2,3-dithiocarbonate is also a preferred vulcanizing agent.

The composition according to the invention is vulcanized by a conventional method to obtain a vulcanized product. The vulcanized product is used for various applications such as rubber parts for use in automobiles.

The present invention can provide a composition for obtaining an epihalohydrin rubber vulcanized product excellent in the heat resistance while maintaining favorable vulcanization rate and store stability, by adding a metal soap thereto to make it act as a vulcanization accelerator.

Further, vulcanized products obtained from the composition can be preferably used as rubber materials for multilayer fuel hoses, multilayer air hoses, tubes, belts, diaphrams, seals and the like for use in automobiles, and rubber materials for rolls, belts and the like for use in general industrial machines, devices and the like.

Ethylene thiourea, lead compound, and nickel compound used so far widely as additives for epichlorohydrin rubbers are so-called environmentally hazardous substances and it has been demanded for the development of epichlorohydrin rubbers not containing them.

The present invention can also provide a composition for vulcanized rubber not containing environmentally hazardous substances and gentle to the environment, and the vulcanized products thereof, by adding a metal soap thereto. (Examples 13 and 14.)

DESCRIPTION OF THE PREFERRED EMBODIMENT

Each of the ingredients constituting the composition of the invention is to be described.

The epihalohydrin rubber (a) as the main component of the composition according to the invention is an epihalohydrin homopolymer or a copolymer of epihalohydrin and other copolymerizable epoxides, for example, ethylene oxide, propylene oxide or aryl glycidyl ether. Examples of them are, for example, epichlorohydrin homopolymer, epibromohydrin homopolymer, epichlorohydrin-ethylene oxide copolymer, epibromohydrin-ethylene oxide copolymer, epichlorohydrin-propylene oxide copolymer, epibromohydrin-propylene oxide copolymer, epichlorohydrin-ethylene oxide-allyl glycidyl ether terpolymer, epibromohydrin-ethylene oxide-allyl glycidyl ether terpolymer, and quaternary polymers such as epichlorohydrin-ethylene oxide-propylene oxide-allyl glycidyl ether quaternary copolymer, epibromohydrin-ethylene oxide-propylene oxide-allyl glycidyl ether quaternary copolymer. The epihalohydrin rubber (a) is, preferably, epichlorohydrin homopolymer, epichlorohidrin-ethylene oxide copolymer, epichlorohydrin-ethylene oxide-allyl glycidyl ether terpolymer, and more preferably, epichlorohydrin-ethylene oxide copolymer and epichlorohydrin-ethylene oxide-allyl glycidyl ether terpolymer.

In the copolymer, the ratio of the components thereof is, for example, from 5 mol % to 95 mol %, preferably, from 10 mol % to 75 mol %, further preferably, from 10 to 65 mol % of epihalohydrin, from 5 mol % to 95 mol %, preferably, from 25 mol % to 90 mol %, further preferably, from 35 mol % to 90 mol % of ethylene oxide, and from 0 mol % to 10 mol %, preferably, from 1 mol % to 8 mol % and, further preferably, from 1 mol % to 7 mol % of allyl glycidyl ether.

The molecular weight of the homopolymer or copolymer is not particularly limited and usually it is about at $ML_{1+4}$ (100° C.)=30 to 150 being expressed by Mooney viscosity.

The metal soap (b) used in the invention is a metal salt of an acid such as higher fatty acid, resin acid or naphthenic acid, preferably, a metal salt of a higher fatty acid having 6 to 30 carbon atoms, more preferably, 12 to 24 carbon atoms. The metal salt of the higher fatty acid can be sodium salt, potassium salt, zinc salt, calcium salt, magnesium salt or lead salt of partially hydrogenated tallow fatty acid, stearic acid, oleic acid, sebacic acid, and castor oil. Preferred salts are partially hydrogenated tallow fatty acid sodium salt, sodium stearate, partially hydrogenated tallow fatty acid potassium salt, and potassium stearate. More preferred salts are sodium stearate and/or potassium stearate. Particularly, use of sodium salt such as partially hydrogenated tallow fatty acid sodium salt and the sodium stearate is preferred since the store stability is favorable.

While the metal soap (b) acts as the heat resistance accelerator for the epihalohydrin rubber, it can be also used, for example, as a lubricant with a general purpose of use in the field of rubbers.

The amount of the metal soap (b) to be added is from 0.1 to 10 parts by weight, preferably, from 0.1 to 5 parts by weight, more preferably, from 0.3 to 3 parts by weight based on 100 parts by weight of the epihalohydrin rubber. When the amount is less than the range described above, the effect as the vulcanization accelerator can not sometimes be exhibited sufficiently and, on the other hand, excess amount does not improve the accelerating effect so much and, further, it may possibly cause poor appearance due to bleeding.

As the acid acceptor (c) used in the invention, known acid acceptors can be used in accordance with the vulcanizing agent. Preferred examples of the acid acceptor (c) are metal compounds and/or inorganic micro-porous crystals. The metal compounds can be those metal compounds such as oxides, hydroxides, carbonates, caboxylates, silicates, borates and phosphates of metals belonging to the group II of the periodical table (group 2 and group 12), oxides, hydroxides, caboxylate, silicates, sulfates, nitrates and phosphates of metals belonging to the group III of the periodical table (group 3 and group 13), and oxides, basic carbonates, basic carboxylate, basic phosphates, basic sulfites, and tribasic sulfates of metals belonging to the group IV of the periodical table (group 4 and group 14).

Specific examples of the metal compounds are, for example, magnesia, magnesium hydroxide, aluminum hydroxide, barium hydroxide, magnesium carbonate, barium carbonate, quick lime, slaked lime, calcium carbonate, calcium silicate, calcium stearate, zinc stearate, calcium phthalate, calcium phosphite, zinc powder, tin oxide, litharge or lead monoxide, red lead oxide, basic lead carbonate, dibasic lead phthalate, dibasic lead carbonate, tin stearate, basic lead phosphite, basic tin phosphite, basic lead sulfite, and tribasic lead sulfate.

Particularly preferred acid acceptor is an inorganic microporous crystal. The inorganic microporous crystal means microporous crystalline material which can be distinguished clearly from porous amorphous materials such as silica gel, alumina, etc.

Examples of the inorganic microporous crystal are zeolites, aluminophosphate type molecular sieves, layered silicate, synthetic hydrotalcite, Li—Al inclusion compounds, and alkali metal titanate. Particularly preferred acid acceptor is, synthetic hydrotalcite.

Zeolites can be various kinds of zeolites such as natural zeolites, as well as A-type, X-type and Y-type synthetic zeolites, sodalites, natural or synthetic mordenites and ZSM-5, and metal substitutes thereof, which can be used each alone or in combination. Metals in the metal substitutes are often sodium. As the zeolites, those having larger acid acceptability are preferred, A-type zeolite being preferred.

The synthetic hydrotalcite is represented by the following general formula (I).

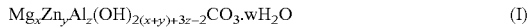

in which x and y each represents a real number of 0 to 10, x+y representing 1 to 10, z representing a real number of 1 to 5, and w represents a real number of 0 to 10, respectively.

Examples of hydrotalcites represented by the general formula (I) are

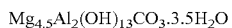

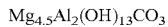

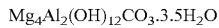

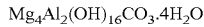

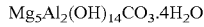

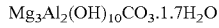

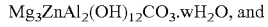

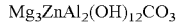

The Li—Al inclusion compound is represented by the following general formula (II):

in which X represents an organic or inorganic anion, n is a valence number for the anion X, and m represents an integer of 3 or less, respectively.

The amount of the acid acceptor to be used is from 0.2 to 50 parts by weight, for example, from 0.5 to 50 parts by weight and, particularly, from 1 to 20 parts by weight based on 100 parts by weight of the epihalohydrin rubber. When the amount is less than the range described above, vulcanization can not be sometimes conducted sufficiently. On the other hand, when the amount exceeds the range described above, the vulcanized product becomes excessively rigid sometimes failing to obtain physical properties usually expected for the epihalohydrin rubber vulcanized product.

Though the vulcanizing agent (d) used in the invention is not particularly limited so long as it can vulcanize the epihalohydrin rubber, known vulcanizing agents utilizing the reactivity of chlorine atom, that is, polyamines, thioureas, thiadiazoles, mercaptotriazines, and quinoxalines, or known vulcanizing agents utilizing the reactivity of the double bond(s) in the side chain, for example, organic peroxides, sulfur, morpholine polysulfides, and thiuram polysulfides are used properly. Preferred vulcanizing agent (d) is a quinoxaline vulcanizing agent or a triazine vulcanizing agent.

Specific examples of polyamines are, ethylene diamine, hexamethylene diamine, diethylene triamine, triethylene tetramine, hexamethylene tetramine, p-phenylene diamine, cumene diamine, N,N'-dicinnamilidene-1,6-hexane diamine, ethylene diamine carbamate, hexamethylene diamine carbamate, etc., examples of thioureas are 2-mercaptoimidazoline, 1,3-diethyl thiourea, 1,3-dibutyl thiourea, trimethyl thiourea, etc., examples of thiadiazoles are, 2,5-dimercapto-1,3,4-thiadiazole, 2-mercapto-1,3,4-thiadiazole-5-thiobenzoate, etc., examples of mercaptotriazines are, 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine, 1-phenylamino-3,5-dimercaptotriazine, etc., examples of quinoxalines are 2,3-dimercaptoquinoxaline, quinoxaline-2,3-dithiocarbonate, 6-methylquinoxaline-2,3-dithiocarbonate, 5,8-dimethylquinoxaline-2,3-dithiocarbonate, etc., examples of organic peroxide are tert-butyl hydroperoxide, p-menthane hydroperoxide, dicumyl peroxide, tert-butyl peroxide, 1,3-bis(tert-butylperoxyisopropyl) benzene, 2,5-dimethyl-2,5-di(tert-butylperoxy) hexane, benzoyl peroxide, tert-butyl peroxy benzoate, etc., examples of morpholine polysulfides are morpholine disulfide, examples of thiuram polysulfides are tetramethyl thiuram disulfide, tetraethyl thiuram disulfide, tetrabutyl thiuram disulfide, dipentamethylene thiuram tetrasulfide, dipehtamethylene thiuram hexasulfide, etc.

The amount of the vulcanizing agent to be used is from 0.1 to 10 parts by weight and, preferably, from 0.3 to 5 parts by weight based on 100 parts by weight of the epihalohydrin rubber. When the amount is less than the range described above, vulcanization can not sometimes be conducted sufficiently and, on the other hand, when the amount exceeds the range described above, the vulcanized products becomes excessively rigid sometimes failing to obtain physical properties usually expected for the epihalohydrin rubber vulcanized product. Particularly preferred vulcanizing agents are, for example, 2-mercaptoimidazoline or 6-methylquinoxaline-2,3-dithiocarbonate, and trimercapto-S-triazine and, further preferably, 6-methylquinoxaline-2,3-dithiocarbonate. The vulcanizing agents can be used each alone or in combination.

The fatty acid (e) added optionally in the invention can be, for example, higher fatty acid salts having 6 to 30 carbon atoms. For example, the metal soap (b) can be the free higher fatty acids having 6 to 30 carbon atoms constituting the metal salts exemplified above. Preferred fatty acids are octylic acid, stearic acid or octadecylic acid.

In the composition of the invention, while the fatty acid (e) acts as a prevulcanization inhibitor (retarder) and it may be used as a lubricant usually used in the field of rubber.

The amount of the fatty acid (e) is from 0.1 to 5 parts by weight, preferably, from 0.1 to 3 parts by weight and, more preferably, from 0.1 to 1 parts by weight based on 100 parts by weight of the epihalohydrin rubber. When the amount is less than the range described above, no sufficient effect as the prevulcanization inhibitor can sometimes be exhibited and, on the other hand, excess amount does not improve the accelerating effect so much and may rather result in poor appearance due to bleeding.

The alcohols (f) optionally added in the invention are not particularly limited so long as they have hydroxyl groups in the molecule and are not evaporated and decomposed during processing and at a working temperature. Examples of such polyhydric alcohols are pentaerythritol, glycerine and sorbitol.

In the invention, the alcohols (f) act as a vulcanization acceleration aid.

The amount of the alcohols (f) is from 0.1 to 5 parts by weight, preferably, from 0.1 to 3 parts by weight and, more preferably, from 0.1 to 1 parts by weight based on 100 parts by weight the epihalohydrin rubber. When the amount is less than the range described above, no sufficient effect as the vulcanization acceleration aid can be exhibited sometimes and, on the other hand, excess amount may possibly cause prevulcanization or result in poor appearance due to bleeding.

In the composition for vulcanized rubber according to the invention, known vulcanization accelerators, retarders, etc. usually used together with the vulcanizing agents can be properly added. Examples of the vulcanization accelerator are, sulfur, thiuram sulfide, morpholine sulfide, amines, weak acid salts of amines, basic silica, quaternary ammonium salts, quaternary phosphonium salts, multi-functional vinyl compounds, mercaptobenzothiazoles, sulpheone amides, and dithiocarbamate. Examples of the retarder are N-cyclohexane thiophthalimide, organic zinc compounds and acidic silica.

Particularly preferred vulcanization accelerators are 1,8-diazabicyclo(5,4,0)undecen-7 (hereinafter simply referred to as DBU) salt, 1,5-diazabicyclo(4,3,0)nonene-5 (hereinafter simply referred to as DBN) salt, and white carbon. Examples of DBU salt are DBU-carbonate, DBU-stearate, DBU-2-ethylhexylate, DBU-benzoate, DBU-salicylate, DBU-3-hydroxy-2-naphthoate, DBU-phenol resinate, DBU-2-mercaptobenzothiazole salt, DBU-2-mercaptobenzimidazole salt, etc. Examples of DBN salt are DBN-carbonate, DBN- stearate, DBN-2-ethylhexylate, DBN-benzoate, DBN-salicylate, DBN-3-hydroxy-2-naphthoate, DBN-phenol resinate, DBN-2-mercaptobenzothiazole salt, and DBN-2-mercaptobenzimidazole salt. The amount of the vulcanization accelerator or retarder is from 0 to 10 parts by weight, for example, from 0.1 to 5 parts by weight based on 100 parts by weight of epihalohydrin rubber.

Further, in the composition for the vulcanized rubber according to the invention, known antioxidants (or aging inhibitors), UV-absorbents and light stabilizers usually used can be added. Examples of the known antioxidants are those of amine, phenol, benzimidazole, dithiocarbamate, thiourea, special wax, organic thioacid and phosphite types. The amount of the antioxidant is from 0.1 to 10 parts by weight, preferably, from 0.1 to 5 parts by weight and, more preferably, from 0.3 to 3 parts by weight based on 100 parts by weight of the epihalohydrin rubber, and two or more of them can be used in combination.

In the composition for the vulcanized rubber according to the invention, other additives than those described above, for example, lubricants, fillers, reinforcing agents, plasticizers, processing aids, flame retardants, blowing aids, conductive agents, and antistatics can be added optionally so long as they do not impair the effect of the invention. Further, blending of rubber, resin or the like conducted usually in the relevant technical field can also be carried out within a range not losing the characteristics of the invention. However, the composition for the vulcanized rubber according to the invention can be that which does not contain environmentally hazardous substances.

For producing a composition for the vulcanized rubber according to the invention, any mixing means used so far in the field of polymer processing, for example, mixing rolls, Banbury mixers, and various kinds of kneaders can be used. The vulcanized product according to the invention can be obtained by heating the composition for the vulcanized rubber of the invention usually at 100 to 200° C. While the vulcanization time is different depending on the temperature, it is usually between 0.5 and 300 minutes. The method of vulcanization molding can be any methods using molding die such as compression molding, injection molding and heating molding by steam can, air bath, infrared rays and microwaves.

The present invention is to be described specifically by way of examples and comparative examples. It should be noted that the invention is not restricted to the following examples unless it does not exceed the gist of the invention.

EXAMPLE (Examples 1 to 14, Comparative Example 1 to 9)

The components shown in the following Tables 1, 4, 6 and 8 are blended at the ratios shown in each of the tables, kneaded with a kneader and an open roll to prepare unvulcanized rubber sheets. For unvulcanized rubbers of Examples 1 to 7 and Comparative Examples 1 to 3, a Mooney scorch test according to JIS K 6300 was conducted. Further, after storing the unvulcanized rubber sheets in the state at 35° C. and at 75% of relative humidity for three days, the Money scorch test was also conducted as a store stability test. The results of the tests are shown in Table 2.

The unvulcanized rubber sheets of Examples 1 to 14 and Comparative Examples 1 to 9 were press-vulcanized at 170° C. for 15 minutes to obtain primary vulcanized products of 2 mm thickness. They were further heated in an air oven at 150° C. for 2 hours to obtain secondary vulcanized products. For the secondary vulcanized products, an initial physical property test was conducted and then a heat resistance test under the conditions at 150° C. for 166-168 hours was conducted in accordance with the test methods described in JIS K 6251, JIS K 6253, and JIS K 6257. The results of the test are shown in Tables 3, 5, 7 and 9.

In Tables 1, 4, 6 and 8, symbols *1 to *8 represent the following products respectiavely.

*1: "EPICHLOMER-C", manufactured by Diso Co., Ltd.; epichlorohydrin-ethylene oxide copolymer,
*2: "DHT-4A" manufactured by Kyowa Chemical Industry Co., Ltd.,
*3: "MIZUKALAC-L" manufactured by Mizusawa Industrial Chemicals Ltd.
*4: "MIZUCALIZER-DS" manufactured by Mizusawa Industrial Chemical Ltd.
*5: "NS soap" manufactured by Kao Corp.
*6: "P-152" manufactured by Daiso Co., Ltd.
*7: "DISONET XL-21S" manufactured by Daiso Co., Ltd.
*8: "OF-100" manufactured by Daiso Co., Ltd.

In Table 2, $V_m$ represents a Mooney viscosity specified by the Mooney scorch test according to JIS K 6300 and $t_s$ represents a Mooney scorch time specified for the Mooney scorch test according to JIS K 6300. By measuring $V_m$ and $t_5$ at the initial state and after storing under wet heat (35° C.×75% RH) for three days, evaluation was conducted for the initial stability and store stability of the unvulcanized rubber compositions. $\Delta V_m$ is the difference of $V_m$ between at the initial stage and after storing under wet heat (at 35° C.×75% RH) for three days, which is a value for evaluating the store stability.

In Tables 3, 5, 7 and 9, $M_{100}$ shows a tensile stress upon 100% elongation specified by the tensile test according to JIS K 6251 and Tb shows a tensile strength specified by the tensile test according to JIS K 6251, which are values for the evaluation of the heat resistance, Eb means an elongation specified by the tensile test according to JIS K 6251 and Hs means the hardness specified by the hardness test according to JIS K 6253 respectively. ΔEb and ΔHs are rate of change of Eb and difference of Hs which are specified by the aging test method according to JIS K 6257.

TABLE 1

| Components | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
| ECH/EO copolymer rubber*1 | 100 | 100 | 100 | 100 | 100 | 100 | 100 | 100 | 100 | 100 |
| FEF carbon (reinforcing agent) | 50 | 50 | 50 | 50 | 50 | 50 | 50 | 50 | 50 | 50 |
| Di(butoxyethoxy)ethyl adipate (plasticizer) | 10 | 10 | 10 | 10 | 10 | 10 | 10 | 10 | 10 | 10 |
| Sorbitan monostearate (lubricant) | 3 | 3 | 3 | 3 | 3 | 3 | 3 | 3 | 3 | 3 |
| Nickel dibutyl dithiocarbamate (antioxidant) | 1 | 1 | 1 | 1 | 1 | 1 | 1 | 1 | 1 | 1 |
| Synthetic hydrotalcite (acid acceptor)*2 | 3 | 3 | 3 | 3 | 3 | 3 | 3 | 3 | 3 | 3 |
| Magnesium oxide (acid acceptor) | | | | | | | | | 3 | |
| Metal soap (manufactured by K.Corp.)*5 | 1 | 3 | 5 | | | 3 | 3 | | | |
| Sodium stearate | | | | 3 | | | | | | |
| Potassium stearate | | | | | 3 | | | | | |
| DBU phenol resinate (accelerator)*6 | | | | | | | | | 1 | 1 |
| Stearic acid | | | | | | 1 | | | | |
| Pentaerythritol | | | | | | | 1 | | | |
| N-cyclohexyl thiophthalimide (retarder) | 1 | 1 | 1 | 1 | 1 | 1 | 1 | 1 | 1 | 1 |
| 6-methyl quinoxaline-2,3-dithiocarbonate (vulcanizing agent)*7 | 1.7 | 1.7 | 1.7 | 1.7 | 1.7 | 1.7 | 1.7 | 1.7 | 1.7 | 1.7 |

TABLE 2

|  | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
| Mooney scorch |  |  |  |  |  |  |  | Not vulcanized |  |  |
| $V_m$ | 52 | 48 | 47 | 45 | 57 | 45 | 49 |  | 52 | 58 |
| $T_5$(min) | 21.1 | 12.6 | 10.9 | 14.0 | 1.8 | 22.1 | 7.8 |  | 11.5 | 19.8 |
| Store stability (3 days) |  |  |  |  |  |  |  |  |  |  |
| $V_m$ | 49 | 46 | 43 | 44 | 64 | 41 | 47 |  | 54 | 56 |
| $\Delta V_m$(points) | −3 | −2 | −4 | −1 | +7 | −4 | −2 |  | +2 | −2 |
| $t_5$(min) | 16.0 | 6.2 | 5.6 | 7.3 | 2.7 | 10.6 | 5.1 |  | 9.2 | 15.2 |

TABLE 3

| Initial physical property | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
| $M_{100}$(MPa) | 3.2 | 3.7 | 3.7 | 3.7 | 3.4 | 3.4 | 3.7 | Not vulcanized | 3.7 | 3.7 |
| Tb(MPa) | 12.7 | 12.8 | 12.0 | 12.1 | 10.1 | 11.8 | 12.1 |  | 12.8 | 14.5 |
| Eb(%) | 630 | 540 | 485 | 490 | 350 | 495 | 515 |  | 455 | 525 |
| Hs(JIS A) | 66 | 67 | 67 | 66 | 64 | 64 | 66 |  | 68 | 68 |
| Heat resistance (150° C. × 166 h) |  |  |  |  |  |  |  |  |  |  |
| $M_{100}$ (Mpa) | 3.0 | 3.8 | 3.9 | 3.4 | 3.3 | 3.5 | 3.8 | — | 2.9 | 2.7 |
| Tb(MPa) | 6.4 | 8.3 | 8.5 | 8.0 | 7.0 | 7.8 | 8.2 | — | 5.0 | 6.3 |
| Δ Tb(%) | −50 | −35 | −29 | −34 | −30 | −34 | −33 | — | −61 | −56 |
| Eb(%) | 280 | 250 | 245 | 275 | 245 | 265 | 255 | — | 205 | 265 |
| Δ Eb(%) | −56 | −54 | −49 | −44 | −30 | −46 | −50 | — | −55 | −50 |
| Hs(JIS A) | 67 | 68 | 70 | 68 | 65 | 68 | 68 | — | 67 | 66 |
| Δ Hs(points) | +1 | +1 | +3 | +2 | +1 | +4 | +2 | — | −1 | −2 |

TABLE 4

| Components | Example 8 | Example 9 | Example 10 | Comp. Example 4 | Comp. Example 5 | Parts by weight Comp. Example 6 |
|---|---|---|---|---|---|---|
| ECH/EO copolymer rubber*1 | 100 | 100 | 100 | 100 | 100 | 100 |
| FEF carbon (reinforcing agent) | 50 | 50 | 50 | 50 | 50 | 50 |
| Di(butoxyethoxy)ethyl adipate (plasticizer) | 10 | 10 | 10 | 10 | 10 | 10 |
| Sorbitan monostearate (lubricant) | 3 | 3 | 3 | 3 | 3 | 3 |
| Nickel dibutyl dithiocarbamate (antioxidant) | 1 | 1 | 1 | 1 | 1 | 1 |
| Li-Al inclusion compound (acid acceptor)*3 | 3 |  |  | 3 |  |  |
| Synthetic zeolite (acid acceptor)*4 |  | 3 |  |  | 3 |  |
| Magnesium oxide (acid acceptor) |  |  | 3 |  |  | 3 |
| Metal soap (manufactured by K.Corp.)*5 | 3 | 3 | 3 |  |  |  |
| N-cyclohexyl thiophthalimide (retarder) | 1 | 1 | 1 | 1 | 1 | 1 |
| 6-methyl quinoxaline-2,3-dithiocarbonate (vulcanizing agent)*7 | 1.7 | 1.7 | 1.7 | 1.7 | 1.7 | 1.7 |

TABLE 5

| Initial physical property | Example 8 | Example 9 | Example 10 | Comp. Example 4 | Comp. Example 5 | Comp. Example 6 |
|---|---|---|---|---|---|---|
| $M_{100}$(MPa) | 3.7 | 2.1 | 2.7 | Not vulcanized | Not vulcanized | Not vulcanized |
| Tb(MPa) | 12.1 | 11.0 | 10.6 | | | |
| Eb(%) | 500 | 730 | 585 | | | |
| Hs(JIS A) | 66 | 59 | 62 | | | |
| Heat resistance (150° C. × 166 h) | | | | | | |
| $M_{100}$(Mpa) | 3.6 | 1.9 | 2.3 | — | — | — |
| Tb(MPa) | 8.2 | 3.5 | 5.1 | — | — | — |
| Δ Tb(%) | −32 | −68 | −52 | — | — | — |
| Eb(%) | 260 | 300 | 290 | — | — | — |
| Δ Eb(%) | −48 | −59 | −50 | — | — | — |
| Hs(JIS A) | 67 | 60 | 65 | — | — | — |
| Δ Hs(points) | +1 | +1 | +3 | — | — | — |

TABLE 6

| Components | Example 11 | Example 12 | Comp. Example 7 | Parts of weight Comp. Example 8 |
|---|---|---|---|---|
| ECH/EO copolymer rubber *1 | 100 | 100 | 100 | 100 |
| FEF carbon (reinforcing agent) | 50 | 50 | 50 | 50 |
| Di(butoxyethoxy)ethyl adipate (plasticizer) | 10 | 10 | 10 | 10 |
| Sorbitan monostearate (lubricant) | 3 | 3 | 3 | 3 |
| Nickel dibutyl dithiocarbamate (antioxidant) | 1 | 1 | 1 | 1 |
| Synthetic hydrotalcite (acid accelerator) *2 | 3 | | 3 | |
| Synthetic zeolite (acid acceptor) *4 | | 3 | | 3 |
| Metal soap (manufactured by K.Corp.) *5 | 3 | 3 | | |
| N-cyclohexyl thiophthalimide (retarder) | 1 | 1 | 1 | 1 |
| Trimercapto-s-triazine (vulcanizing agent) *8 | 1 | 1 | 1 | 1 |

TABLE 7

| | Example 11 | Example 12 | Comp. Example 7 | Comp. Example 8 |
|---|---|---|---|---|
| Initial physical property | | | | |
| $M_{100}$(MPa) | 4.9 | 3.0 | Not vulcanized | Not vulcanized |
| Tb(MPa) | 11.7 | 9.2 | | |
| Eb(%) | 325 | 415 | | |
| Hs(JIS A) | 67 | 61 | | |
| Heat resistance (150° C. × 166 h) | | | | |
| $M_{100}$(Mpa) | 5.9 | 4.1 | — | — |
| Tb(MPa) | 10.4 | 8.2 | — | — |
| Δ Tb(%) | −11 | −11 | — | — |
| Eb(%) | 185 | 210 | — | — |
| Δ Eb(%) | −43 | −49 | — | — |
| Hs(JIS A) | 70 | 66 | — | — |
| Δ Hs(points) | +3 | +5 | — | — |

TABLE 8

| Components | Example 13 | Example 14 | Parts by weight Comp. Example 9 |
|---|---|---|---|
| ECH/EO copolymer rubber *1 | 100 | 100 | 100 |
| FEF carbon (reinforcing agent) | 50 | 50 | 50 |
| Di(butoxyethoxy)ethyl adipate (plasticizer) | 10 | 10 | 10 |
| Sorbitan monostearate (lubricant) | 3 | 3 | 3 |
| Nickel dibutyl dithiocarbamate (antioxidant) | | | 1 |
| bis (1,2,2,6,6-pentamethyl-4-piperidyl) sebacate (antioxidant) | | 1 | |
| 2-mercaptomethyl benzimidazole (antioxidant) | 0.5 | | |
| $Pb_3O_4$ (acid acceptor) | | | 5 |
| Synthetic hydrotalcite (acid acceptor) *2 | 3 | 3 | |
| o,o'-dibenzamide diphenyl disulfide (mastication accelerator) | | | 0.5 |
| Ethylene thiourea (vulcanizing agent) | | | 1.4 |
| Metal soap (manufactured by K.Corp.)*5 | 3 | 3 | |
| N-cyclohexyl thiophthalimide (retarder) | 1 | 1 | |
| 6-methyl quinoxaline-2,3-dithiocarbonate (vulcanizing agent) *7 | 1.7 | 1.7 | |

TABLE 9

|  | Example 13 | Example 14 | Comp. Example 9 |
|---|---|---|---|
| Initial physical property | | | |
| $M_{100}$(MPa) | 4.3 | 4.3 | 4.5 |
| Tb(MPa) | 12.7 | 12.6 | 13.4 |
| Eb(%) | 455 | 480 | 425 |
| Hs(JIS A) | 71 | 70 | 71 |
| Heat resistance (150° C. × 168 h) | | | |
| $M_{100}$ (Mpa) | 4.2 | 4.7 | 3.4 |
| Tb(MPa) | 7.1 | 7.9 | 6.1 |
| Δ Tb(%) | −44 | −37 | −55 |
| Eb(%) | 230 | 185 | 205 |
| Δ Eb(%) | −49 | −61 | −52 |
| Hs(JIS A) | 75 | 75 | 72 |
| Δ Hs(points) | +4 | +5 | +1 |

In the invention, good heat resistance means that the value of the tensile strength (Tb) obtained in the heat resistance test for the vulcanized products in each of the tables is large and good store stability of the unvulcanized rubber sheet means that increase of viscosity ($\Delta V_m$) during storage for a predetermined time at predetermined temperature and humidity is small. In Tables 1 and 2, Comparative Example 1 is a composition containing neither metal soap nor the vulcanization accelerator and the vulcanization did not proceed. On the contrary, vulcanization proceeded in each of the compositions of Examples 1 to 3 in which the metal soap A was added, Example 4 in which sodium stearate was added and Example 5 in which potassium stearate was added.

Table 2 shows the result of the store stability test for the unvulcanized products. Increase in the viscosity was not observed even when the amount of the vulcanization accelerator was increased in the compositions for Examples 1 to 3 in which the metal soap A was added, while increase in the viscosity was observed, although little, in the composition of Comparative Examples 2 and 3 used practically at present in which a DBU salt being the known vulcanization accelerator was added.

It can be seen that the scorch time is extended and the fatty acid acts as the prevulcanization inhibitor in the composition of Example 6 in which the fatty acid is added.

Since the scorching time is shortened and the viscosity less increases in the composition of Example 7 in which the alcohol is added, it can be seen that the alcohol acts a favorable acceleration aid.

In the heat resistance test shown in Table 3, it can be seen that the heat resistance is greatly improved for the vulcanized products of Examples 1 to 7 in which the metal soaps are added compared with those of Comparative Examples 2 and 3.

Table 4 shows compositions of changing the acid acceptor and Table 5 shows the result of the test for the vulcanized product obtained from the compositions. Table 6 shows the compositions of changing the vulcanizing agent and Table 7 shows the result of the test for the vulcanized product obtained from the compositions. Also in Tables 5 and 6, same result as in Table 3 is recognized.

Table 8 shows the composition (Example 13) which does not contain an antioxidant and a composition (Example 14) which contains a non-nickel type antioxidant, and Table 9 shows the results of the test for the vulcanized products obtained from these compositions.

It is recognized that the heat resistance of the vulcanized products of these Examples stands comparison with that of the vulcanized product obtained from the compound which contains a nickel type antioxidant (Comparative Example 9).

As has been described above, it can be seen that the compositions of the examples containing the metal soaps are excellent in the store stability compared with the compositions of the comparative examples not containing them, and the vulcanized products obtained from the compositions of the examples are excellent in the heat resistance compared with that obtained from the compositions of the comparative examples in view of each of the tests described above.

What is claimed is:

1. A composition for vulcanized rubber comprising (a) 100 parts by weight of an epihalohydrin rubber, (b) 0.3 to 5 parts by weight of sodium salt and/or potassium salt of a fatty acid having 12 to 24 carbon atoms, (c) 1 to 20 parts by weight of an acid acceptor, wherein the acid acceptor is synthetic hydrotalcites, and (d) 0.3 to 5 parts by weight of a vulcanizing agent, wherein the vulcanizing agent is a quinoxaline vulcanizing agent.

2. A composition for vulcanized rubber according to claim 1, further containing (e) 0.1 to 3 parts by weight of a fatty acid and/or (f) 0.1 to 3 parts by weight of an alcohol.

3. A composition for vulcanized rubber according to claim 1, wherein the sodium salt and/or potassium salt of fatty acid having 12 to 24 carbon atoms is sodium stearate salt and/or potassium stearate.

4. A composition for vulcanized rubber according to claim 1, wherein the vulcanizing agent is 6-methyl quinoxaline-2,3-dithiocarbonate.

5. A vulcanized product obtained by vulcanizing the composition for vulcanized rubber according to claim 1.

6. A rubber part for use in automobiles comprising the vulcanized product according to claim 5.

* * * * *